United States Patent
Koyasu et al.

[11] Patent Number: 5,268,341
[45] Date of Patent: Dec. 7, 1993

[54] DIELECTRIC CERAMIC COMPOSITION FOR HIGH-FREQUENCY USE AND DIELECTRIC MATERIAL

[75] Inventors: Shigeji Koyasu; Djuniadi A. Sagala; Shinji Nambu; Hidenori Miyata; Seiichiro Hirahara; Nobuyoshi Fujikawa; Gentaro Kaji, all of Kokubu, Japan

[73] Assignee: Kyocera Corporation, Kyoto, Japan

[21] Appl. No.: 968,283

[22] Filed: Oct. 29, 1992

[30] Foreign Application Priority Data

Oct. 30, 1991 [JP] Japan .................. 284470
Apr. 23, 1992 [JP] Japan .................. 104303
Oct. 22, 1992 [JP] Japan .................. 284322

[51] Int. Cl.$^5$ .................................................. C04B 35/00
[52] U.S. Cl. ................................................. 501/135
[58] Field of Search ...................................... 501/135

[56] References Cited

FOREIGN PATENT DOCUMENTS

| | | | |
|---|---|---|---|
| 0452945 | 10/1991 | European Pat. Off. | 501/135 |
| 3444340 | 6/1985 | Fed. Rep. of Germany | 501/135 |
| 1040869 | 2/1986 | Japan | 501/135 |
| 1078007 | 4/1986 | Japan | 501/135 |
| 1142602 | 6/1986 | Japan | 501/135 |
| 4004509 | 5/1992 | Japan | 501/135 |

*Primary Examiner*—Mark L. Bell
*Assistant Examiner*—Deborah Jones
*Attorney, Agent, or Firm*—Spensley Horn Jubas & Lubitz

[57] ABSTRACT

A dielectric material for high frequency having a composition formula $xBaO \cdot yMgO \cdot zWO_3$, a composition formula $xSrO \cdot yMgO \cdot zWO_3$ or a composition formula $xBaO \cdot yMgO \cdot zWO_3 \cdot wTaO_{5/2}$ wherein x, y, z and w have a specified relationship. It has a high inductivity and a high Q value in a high frequency region especially a microwave and a milliwave.

5 Claims, 4 Drawing Sheets

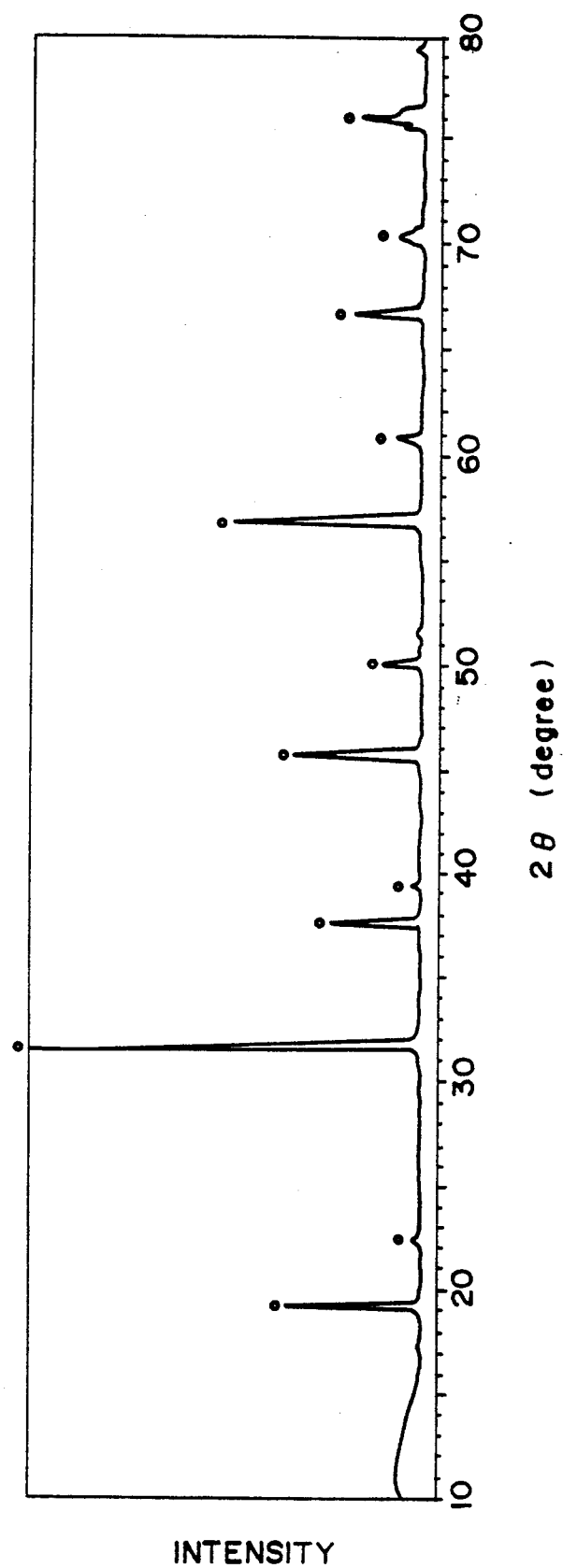

DIELECTRIC CERAMIC COMPOSITION FOR HIGH-FREQUENCY USE AND DIELECTRIC MATERIAL

BACKGROUND OF THE INVENTION

1. Field of the Invention

The present invention relates to a novel dielectric ceramic composition and a novel dielectric material that exhibit high dielectric constants and high Q-values in high-frequency regions such as of microwaves, milliwaves and like waves.

2. Description of the Prior Art

The dielectric ceramics are widely used as dielectric resonators and as dielectric substrates for MICs in high-frequency regions such as of microwaves and milliwaves.

As the dielectric ceramics of this kind, there have heretofore been known, for example, $ZrO_2$-$SnO_2$-$TiO_2$ type materials, $BaO$-$TiO_2$ type materials, $(Ba, Sr)(Zr, Ti)O_3$ type materials, and $Ba(Zn, Ta)O_3$ type materials.

Owing to improvements in regards aspects, the above-mentioned materials now have properties such as dielectric constants of 20 to 40 and Q-values of 1000 upto 3000 at frequencies of 500 MHz upto 5 GHz, as well as a temperature coefficient ($\tau f$) of resonance frequency of around 0 ppm/° C.

In recent years, however, more improved dielectric properties and, particularly, further increased Q-values have been demanded for the dielectric materials accompanying the trend toward using ever higher frequencies. With the above-mentioned conventional dielectric materials, at the present condition high Q-values of practical level are not imparted that can be applied in the actual frequency region of 10 GHz.

SUMMARY OF THE INVENTION

The object of the present invention therefore is to provide a dielectric ceramic composition and a dielectric material that exhibit large dielectric constants and large Q-values in high-frequency regions to meet the above-mentioned demands.

The present inventors have studied the aforementioned problems and have discovered the fact that a dielectric ceramic composition that contains BaO or SrO and MgO as well as $WO_3$ in amounts of a particular ratio forms a dielectric material which comprises a perovskite-type crystal phase as a main crystal phase and which exhibits the aforementioned dielectric properties in excellent condition.

The present inventors have further discovered that a composition which contains BaO, MgO, $WO_3$ and $Ta_2O_5$ in amounts of a particular ratio serves as a dielectric ceramic composition that exhibits excellent dielectric properties.

According to the present invention, therefore, there is provided a composition which comprises BaO, MgO and $WO_3$, wherein when a composition formula by a molar ratio is expressed as $xBaO \cdot yMgO \cdot zWO_3$, said values x, y and z are set within composition ranges that satisfy $0.40 \leq x \leq 0.55$; $0.15 \leq y \leq 0.40$; $0.20 \leq z \leq 0.30$ and $x+y+z=1$.

There is further provided a dielectric material which comprises a perovskite-type crystal phase represented by $Ba(Mg_{1/2}W_{1/2})O_3$ as a main crystal phase and which exhibits excellent dielectric properties.

According to the present invention, furthermore, there is provided a ceramic composition which comprises SrO, MgO and $WO_3$, wherein when a composition formula by a molar ratio is expressed as $xSrO \cdot yMgO \cdot zWO_3$, said values x, y and z are set within composition ranges that satisfy $0.30 \leq x \leq 0.70$; $0.10 \leq y \leq 0.30$; $0.20 \leq z \leq 0.40$ and $x+y+z=1$.

There is further provided a dielectric material which comprises a perovskite-type crystal phase represented by $Ba(Mg_{1/2}W_{1/2})O_3$ as a main crystal phase and which exhibits excellent dielectric properties.

According to the present invention, furthermore, there is provided a ceramic composition which comprises SrO, MgO and $WO_3$, wherein when a composition formula by a molar ratio is expressed as $xSrO \cdot yMgO \cdot zWO_3$, said values x, y and z are set within composition ranges that satisfy $0.30 \leq x \leq 0.70$; $0.10 \leq y \leq 0.30$; and $0.20 \leq z \leq 0.40$.

According to the present invention, furthermore, there is provided a dielectric ceramic composition which comprises BaO, MgO, $WO_3$ and $Ta_2O_3$, wherein when a composition formula by a molar ratio is expressed as $xBaO \cdot yMgO \cdot zWO_3 \cdot wTaO_{5/2}$, said values x, y, z and w are set within composition ranges that satisfy $0.40 \leq x \leq 0.55$; $0.10 \leq y \leq 0.40$; $0 < z \leq 0.30$; and $0 < w < 0.40$ (wherein $0.20 \leq z+w \leq 0.40$; $0.17 \leq 5|x-0.5| + y + 0.2z < 0.94$; $x+y+z+w=1$.)

BRIEF DESCRIPTION OF THE DRAWINGS

FIG. 4 is an X-ray diffraction chart of a sample No. 7 in Example 2.

DETAILED DESCRIPTION OF THE PREFERRED EMBODIMENT

Figure 1:
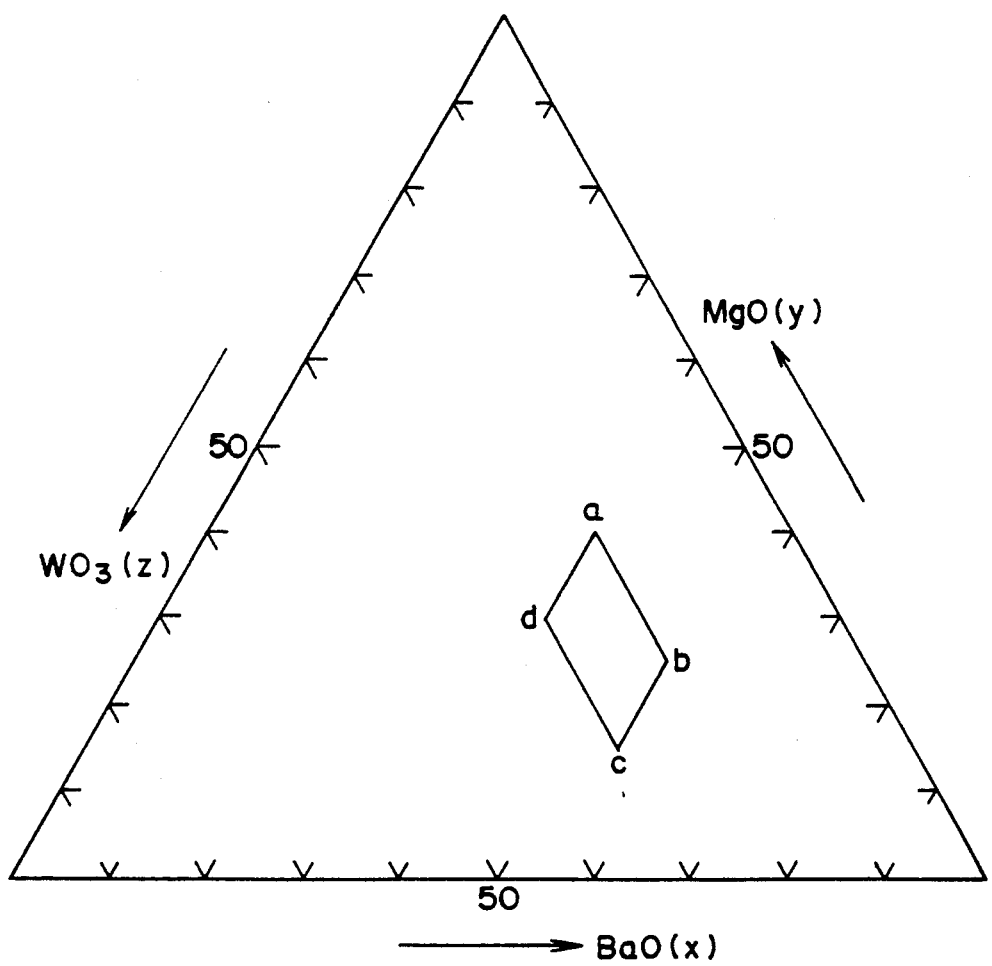
FIG. 1 is a three-dimensional diagram of BaO-MgO-$WO_3$ illustrating the ranges of the present invention.

A dielectric ceramic composition of a first type of the present invention comprises a composite metal oxide of BaO, MgO and $WO_3$, and its composition ranges are as shown in a three-dimensional diagram of FIG. 1. In FIG. 1, when a region surrounded by dots a-b-c-d-a, i.e., when a composition formula by a molar ratio is expressed as $xBaO \cdot yMgO \cdot zWO_3$, the values x, y and z are set within regions that satisfy $0.40 \leq x \leq 0.55$; $0.15 \leq y \leq 0.40$; $0.20z \leq 0.30$ and $x+y+z=1$.

The ratios are set within the above ranges because of the reasons that when the amount (x) of BaO is smaller than 0.40, the Q-value decreases and when it is greater than 0.55, it becomes difficult to carry out the sintering. When the amount (y) of MgO becomes smaller than 0.15, it becomes difficult to carry out the sintering and the Q-value decreases and when it becomes greater than 0.40, the Q-value decreases. Moreover, when the amount (z) of $WO_3$ is smaller than 0.20, the sintering property is lost and when it is greater than 0.30, the Q-value decreases.

It is preferred that x ranges from 0.45 to 0.55, y ranges from 0.20 to 0.30, and z ranges from 0.20 to 0.30. Most desirably, x should be about 0.50, y should be about 0.25, and z should be about 0.25.

The dielectric material of the present invention comprises BaO, MgO and $WO_3$, which is constituted by a perovskite-type crystal phase represented by $Ba(Mg_{1/2}W_{1/2})O_3$ as a main crystal phase. That is, the crystals in the dielectric material have the perovskite type crystal structure in which the site A is constituted by Ba and the site B is constituted by Mg and W at a ratio of 1:1. The material having such crystals may be in the form of either polycrystals such as a sintered product or a single crystal.

Figure 3:
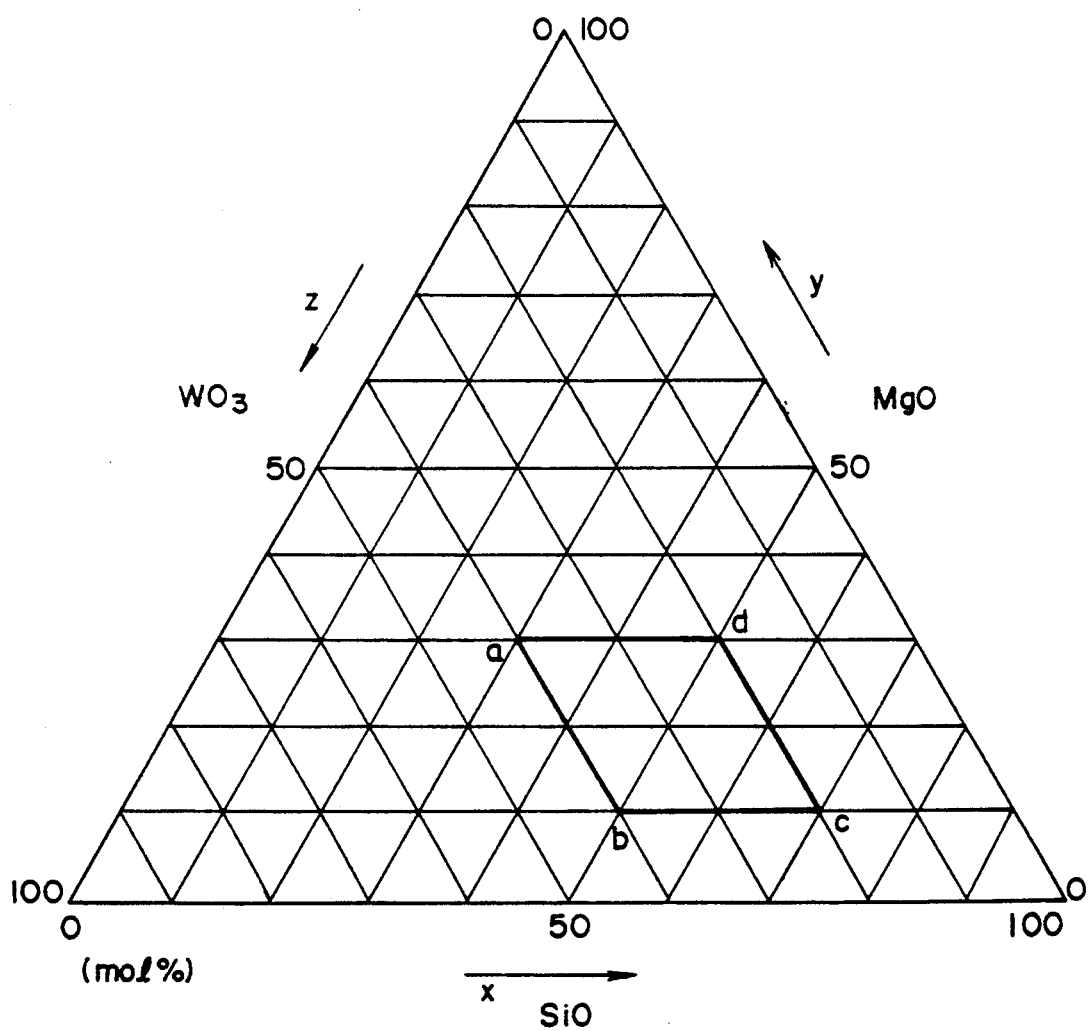
FIG. 3 is a three-dimentional diagram of SrO-MgO-$WO_3$ illustrating the ranges of the present invention.

A dielectric ceramic composition of a second type of the present invention comprises a composite metal oxide of SrO, MgO and $WO_3$, and its composition ranges are as shown in a three-dimensional diagram of FIG. 3. In FIG. 3, when a region surrounded by dots a-b-c-d-a, i.e., when a composition formula by a molar ratio is expressed as $xSrO \cdot yMgO \cdot zWO_3$, the values x, y and z are set within regions that satisfy $0.30 \leq x \leq 0.70$; $0.10 \leq y \leq 0.30$; $0.20 \leq z \leq 0.40$ and $x+y+z=1$.

The ratios are set within the above ranges because of the reasons that when the amount (x) of SrO is smaller than 0.30, the Q-value decreases and when it becomes greater than 0.70, it becomes difficult to carry out the sintering. When the amount (y) of MgO becomes smaller than 0.10, it becomes difficult to carry out the sintering and the Q-value decreases and when it becomes greater than 0.30, the Q-value decreases. Moreover, when the amount (z) of $WO_3$ is smaller than 0.20, the sintering property is lost and when it is greater than 0.40, the Q-value decreases.

It is preferred that x ranges from 0.45 to 0.55, y ranges from 0.20 to 0.30, and z ranges from 0.20 to 0.30. Most desirably, x should be about 0.50, y should be about 0.25, and z should be about 0.25.

The dielectric material of the present invention comprises SrO, MgO and $WO_3$, which is constituted by a perovskite-type crystal phase represented by $Sr(Mg_{1/2}W_{1/2})O_3$ as a main crystal phase. That is, the crystals in the dielectric material have the perovskite-type crystal structure in which the site A is constituted by Sr and the site B is constituted by Mg and W at a ratio of 1:1. The material having such crystals may be in the form of either polycrystals such as a sintered product or a single crystal.

To prepare a ceramic based upon the present invention, there are used, as starting materials, oxides of, for example, Ba or Sr and Mg as well as W, or metal salts such as carbonates and nitrates that form oxides upon baking. These materials are then weighed so as to satisfy the above-mentioned ranges and are sufficiently mixed together. The mixture is calcined at 900° C. to 1100° C. and is pulverized. The calcined powder is molded into a predetermined shape by such a molding method as press molding or doctor blade method.

The molded article is then baked in an oxidizing atmosphere such as in the open air at 1300° C. to 1600° C. to obtain a dielectric ceramic having a relative density of greater than 90%.

A dielectric ceramic composition of a third type of the present invention comprises a composite metal oxide of BaO, MgO, $WO_3$ and $Ta_2O_3$. When a composition formula by a molar ratio is expressed as $xBaO \cdot yMgO \cdot zWO_3 \cdot wTaO_{5/2}$, the values x, y, z and w are set within regions that satisfy $0.40 \leq x \leq 0.55$; $0.10 \leq y \leq 0.40$; $0 < z \leq 0.30$; $0 < w < 0.40$ (wherein $0.20 \leq z+w \leq 0.40$; $0.17 \leq 5|x-0.5| + y + 0.2z < 0.94$; $x+y+z=1$).

The ratios are set within the above ranges because of the reasons that when the amount (x) of BaO is smaller than 0.40, the Q-value decreases and when it becomes greater than 0.55, it becomes difficult to carry out the sintering. When the amount (y) of MgO is smaller than 0.10, the sintering property is lost and the Q-value decreases and when it becomes greater than 0.40, the Q-value tends to be decreased. Furthermore, when the amount (z) of $WO_3$ is greater than 0.30, the Q-value decreases. It is desired that z is greater than 0.01 and w is greater than 0.01.

In the dielectric ceramic composition of the present invention, the molar ratio of $Ta_2O_5$, BaO, MgO and $WO_3$ is changed to freely control the temperature characteristics of resonance frequency over a predetermined region yet maintaining a large Q-value.

Moreover, a range is specified to be $0.20 \leq z+w \leq 0.40$. This is because when $z+w$ is smaller than 0.2 or is greater than 0.4, the Q-value decreases and the ceramic composition is poorly sintered.

A range is further specified to be $0.17 \leq 5|x-0.5| + y + 0.2z < 0.94$. This is because when the value $5|x-0.5| + y + 0.2z$ is smaller than 0.17 or is not smaller than 0.94, the Q-value decreases and the ceramic composition is poorly sintered.

To prepare a ceramic based upon the present invention, there are used, as starting materials, oxides of, for example, Ba, Mg, W and Ta, or metal salts such as carbonates and nitrates that form oxides upon baking. These materials are then weighed so as to satisfy the above-mentioned ranges and are sufficiently mixed together. The mixture is calcined at 900° to 1200° C. and is pulverized. The calcined powder is molded into a predetermined shape by such a molding method as press molding or doctor blade method.

The molded article is then baked in an oxidizing atmosphere such as in the open air at 1300° to 1600° C. to obtain a dielectric ceramic.

In the dielectric ceramic composition of the third type, the molar ratio of BaO, MgO, $WO_3$ and $Ta_2O_3$ is changed to freely control the temperature characteristics of resonance frequency over a predetermined region yet maintaining a large Q-value. That is, the temperature coefficient $\tau f$ tends to be increased with an increase in the amount of Ta, making it possible to control the temperature coefficient $\tau f$. The invention will now be described by way of the following working examples.

EXAMPLE 1

Powders of $BaCO_3$, $MgCO_3$ and $WO_3$ having purities of greater than 99% were used as starting materials, weighed at ratios shown in Table 1, introduced together with water into a ball mill lined with a rubber, and were wet-mixed for 8 hours. The mixture was dehydrated, dried calcined at 1000° C. for two hours. Then, water and an inorganic binder were introduced into the ball mill, and the calcined product was wet-pulverized for 8 hours.

The pulverized product was dried, granulated passing through a sieve of #50 mesh, and the obtained powder was molded under a pressure of 2000 kg/cm² into a disk measuring 10 mm in diameter and 5 mm in thickness. The disk was further baked under the conditions of 1400° to 1550° C. for 6 hours to obtain a ceramic sample.

The thus obtained ceramic sample was measured for its relative dielectric constant ($\epsilon r$) and Q-value at a frequency of 10 GHz by the dielectric resonator method. Moreover, a temperature coefficient ($\tau f$) of resonance frequency was calculated from a change in the resonance frequency depending upon the temperature over a range of from 25° C. to 85° C. The results were as shown in Table 1.

TABLE 1

| Sample No. | xBaO.yMgO.WO_3 | | | Relative dielectric constant $\epsilon r$ | Q-value | Temp coefficient of resonance freq. $\tau f$ (ppm/°C.) |
| --- | --- | --- | --- | --- | --- | --- |
| | x | y | z | | | |
| 1 | 0.450 | 0.300 | 0.250 | 17 | 8300 | −25 |
| 2 | 0.550 | 0.250 | 0.200 | 17 | 4000 | −8 |
| 3 | 0.500 | 0.200 | 0.300 | 15 | 3000 | −23 |
| *4 | 0.600 | 0.150 | 0.250 | — | <100 | — |
| *5 | 0.500 | 0.350 | 0.150 | | poorly sintered | |
| *6 | 0.400 | 0.250 | 0.350 | | poorly sintered | |
| *7 | 0.350 | 0.400 | 0.250 | — | <100 | — |
| *8 | 0.650 | 0.250 | 0.100 | | poorly sintered | |
| *9 | 0.500 | 0.100 | 0.400 | — | <100 | — |
| 10 | 0.500 | 0.250 | 0.250 | 20 | 13000 | −30 |
| 11 | 0.475 | 0.275 | 0.250 | 19 | 11000 | −26 |
| 12 | 0.500 | 0.225 | 0.275 | 17 | 10000 | −23 |
| 13 | 0.525 | 0.225 | 0.250 | 18 | 12000 | −28 |
| 14 | 0.500 | 0.275 | 0.225 | 19 | 12000 | −28 |
| 15 | 0.550 | 0.200 | 0.250 | 17 | 4000 | −16 |
| 16 | 0.500 | 0.300 | 0.200 | 15 | 3000 | −9 |
| 17 | 0.400 | 0.350 | 0.250 | 17 | 3300 | −13 |

*Samples marked with * lie outside the scope of the present invention.

Table 1 shows that the samples Nos. 4, 5, 6, 7, 8 and 9 of which the blending compositions of BaO, MgO and WO_3 lie outside the scope of the present invention, all exhibit Q-values which are smaller than 100, and are poorly sintered. On the other hand, the samples of the present invention exhibit relative dielectric constants of greater than 15, Q-values of greater than 3000, and temperature coefficients of resonance frequency of smaller than 30 ppm/° C. in absolute values. In particular, a sample No. 10 comprising BaO, MgO and WO_3 at a ratio of 1:0.5:0.5 exhibits very excellent properties such as a dielectric constant of 20 and a Q-value of greater than 13000.

Figure 2:
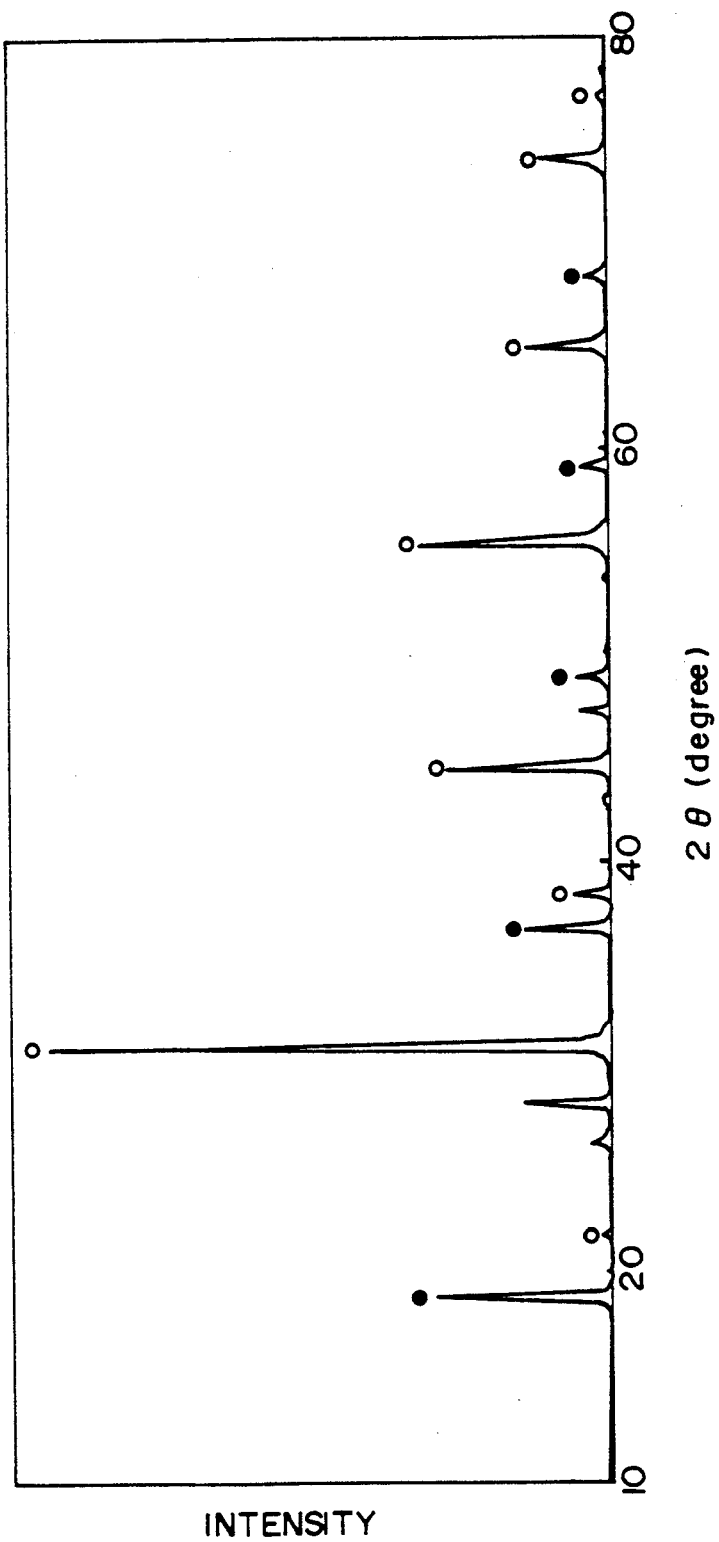
FIG. 2 is an X-ray diffraction chart of a sample No. 10 in Example 1.

The ceramic sample No. 10 was subjected to the X-ray analysis. The results were as shown in FIG. 2 from which the perovskite-type crystal structure is manifested by peaks of open circles and it is presumed that the composition formula is $Ba(Mg_{1/2}W_{1/2})O_3$. Moreover, peaks of black circles indicate a super lattice structure of Mg and W.

According to the present invention as described above in detail, BaO, MgO and WO_3 are blended together at a predetermined ratio to obtain a large dielectric constant and a large Q-value in high-frequency regions. Thus, the dielectric ceramic composition can be favorably used as a material for resonators and as a dielectric substrate materials for MICs which are used in the microwave and milliwave regions.

EXAMPLE 2

Powders of $SrCO_3$, $MgCO_3$ and $WO_3$ having purities of greater than 99% were used as starting materials, weighted at ratios shown in Table 2, introduced together with water into a ball mill lined with a rubber, and were wet-mixed for 8 hours. The mixture was then dehydrated, dried and calcined at 1000° C. for two hours. Water and an inorganic binder were then introduced into the ball mill, and the calcined product was wet-pulverized for 8 hours.

The pulverized product was dried, granulated passing through a sieve of #50 mesh, and the obtained powder was molded under a pressure of 3000 kg/cm² into a disk measuring 10 mm in diameter and 5 mm in thickness. The disk was further baked under the conditions of 1400° to 1550° C. for 6 hours to obtain a ceramic sample.

The thus obtained ceramic sample was measured for its relative dielectric constant ($\epsilon r$) and Q-value at a frequency of 10 GHz by the dielectric resonator method. Moreover, a temperature coefficient ($\tau f$) of resonance frequency was calculated from a change in the resonance frequency depending upon the temperature over a range of from 25° C. to 85° C. The results were as shown in Table 2.

TABLE 2

| Sample No. | xSrO | yMgO | zWO_2 | Measurement Frequency 10 GHz | | |
| --- | --- | --- | --- | --- | --- | --- |
| | x | y | z | $\epsilon r$ | Q | $\tau f$ |
| 1 | 0.50 | 0.20 | 0.30 | 17 | 7900 | −69 |
| *2 | 0.50 | 0.35 | 0.15 | | poorly sintered | |
| 3 | 0.40 | 0.25 | 0.35 | 10 | 1200 | −58 |
| *4 | 0.35 | 0.40 | 0.25 | — | Q < 100 | — |
| *5 | 0.65 | 0.25 | 0.10 | | poorly sintered | |
| 6 | 0.50 | 0.10 | 0.40 | 12 | 1500 | −55 |
| 7 | 0.50 | 0.25 | 0.25 | 20 | 7900 | −55 |
| 8 | 0.40 | 0.25 | 0.35 | 16 | 4300 | −52 |
| 9 | 0.50 | 0.15 | 0.35 | 11 | 3400 | −55 |
| 10 | 0.60 | 0.15 | 0.25 | 17 | 3700 | −63 |
| 11 | 0.60 | 0.10 | 0.30 | 10 | 3000 | −50 |
| *12 | 0.40 | 0.10 | 0.50 | — | Q < 100 | — |
| 13 | 0.45 | 0.15 | 0.40 | 15 | 3300 | −54 |

*Samples marked with * lie outside the scoper the present invention

Table 2 shows that the sample Nos. 2, 4, 5 and 12 of which the blending compositions of SrO, MgO and WO_3 lie outside the scope of the present invention, all exhibit Q-values which are smaller than 100, and are poorly sintered. On the other hand, the samples of the present invention exhibit specific inductivities of greater than 10, Q-values of greater than 1200, and temperature coefficients of resonance frequency of smaller than 70 ppm/° C. in absolute values. In particular, a sample No. 7 comprising SrO, MgO and WO_3 at a ratio of 1:0.5:0.5 exhibits very excellent properties such as a dielectric constant of 20 and a Q-value of 7900.

The ceramic sample No. 7 was subjected to the X-ray analysis. The results were as shown in FIG. 4 from which the perovskite-type crystal structure is manifested by peaks of open circles and it is pressumed that the composition formula is $Sr(Mg_{1/2}W_{1/2})O_3$. Moreover, peaks of black circles indicate a super lattice structure of Mg and W.

According to the present invention as described above in detail, SrO, MgO and WO_3 are blended together at a predetermined ratio to obtain a large dielectric constant and a large Q-value in high-frequency regions. Thus, the dielectric ceramic composition can be favorably used as a material for resonators and as a dielectric substrate material for MICs which are used in the microwave and milliwave regions.

EXAMPLE 3

Powders of $BaCO_3$, $MgCO_3$, $WO_3$ and $Ta_2O_3$ having purities of greater than 99% were used as starting materials, weighed at ratios shown in Table 3, introduced together with water into a ball mill lined with a rubber, and were wet-mixed for 8 hours. The mixture was then dehydrated, dried and calcined at 1000° C. for two hours. Water and an inorganic binder were then introduced into the ball mill, and the calcined product was wet-pulverized for 8 hours.

The pulverized product was dried, granulated passing through a sieve of #50 mesh, and the obtained powder was molded under a pressure of 3000 kg/cm² into a disk measuring 10 mm in diameter and 5 mm in thickness. The disk was further baked under the conditions of 1400° to 1600° C. for 6 hours to obtain a ceramic sample.

The thus obtained ceramic sample was measured for its relative dielectric constant ($\epsilon r$) and Q-value at a frequency of 10 GHz by the dielectric resonator method. Moreover, a temperature coefficient ($\tau f$) of resonance frequency was calculated from a change in the resonance frequency depending upon the temperature over a range of from 25° C. to 85° C. The results were as shown in Table 3.

TABLE 3

| Sample No. | xBaO·yMgO·zWO₃·wTaO₅/₂ | | | | | | relative dielectric constant $\epsilon r$ | Q-value | Temp. coefficient of resonance frequency $\tau f$ (ppm/°C.) |
|---|---|---|---|---|---|---|---|---|---|
| | x | y | z | w | z + w | 5\|x − 0.5\| + y + 0.2z | | | |
| *1 | 0.50 | 0.25 | 0.25 | 0 | 0.25 | 0.30 | 19 | 12000 | −30 |
| 2 | 0.49 | 0.24 | 0.26 | 0.01 | 0.27 | 0.342 | 19 | 13000 | −28 |
| 3 | 0.50 | 0.30 | 0.15 | 0.05 | 0.20 | 0.33 | 18 | 4200 | −27 |
| *4 | 0.50 | 0.35 | 0.05 | 0.10 | 0.15 | 0.36 | — | <100 | — |
| 5 | 0.50 | 0.15 | 0.30 | 0.05 | 0.35 | 0.21 | 21 | 4000 | −26 |
| 6 | 0.50 | 0.20 | 0.15 | 0.15 | 0.30 | 0.23 | 22 | 9400 | −13 |
| 7 | 0.49 | 0.25 | 0.06 | 0.20 | 0.26 | 0.312 | 23 | 12000 | −5 |
| *8 | 0.50 | 0.10 | 0.25 | 0.15 | 0.40 | 0.15 | 18 | 900 | −11 |
| 9 | 0.50 | 0.15 | 0.10 | 0.25 | 0.35 | 0.17 | 23 | 5000 | +2 |
| 10 | 0.50 | 0.20 | 0.01 | 0.28 | 0.29 | 0.252 | 24 | 13000 | +6 |
| *11 | 0.50 | 0.05 | 0.20 | 0.25 | 0.45 | 0.09 | — | <100 | — |
| *12 | 0.50 | 0.10 | 0.05 | 0.35 | 0.40 | 0.11 | 25 | 1100 | +12 |
| 13 | 0.52 | 0.10 | 0.05 | 0.33 | 0.38 | 0.21 | 24 | 3100 | +1 |
| 14 | 0.48 | 0.15 | 0.05 | 0.32 | 0.37 | 0.26 | 25 | 3000 | +1 |
| 15 | 0.40 | 0.40 | 0.19 | 0.01 | 0.20 | 0.938 | 15 | 3200 | −5 |
| 16 | 0.40 | 0.30 | 0.10 | 0.20 | 0.30 | 0.82 | 13 | 3100 | −8 |
| 17 | 0.40 | 0.20 | 0.01 | 0.29 | 0.30 | 0.702 | 13 | 3100 | +13 |
| *18 | 0.45 | 0.10 | 0.35 | 0.10 | 0.45 | 0.42 | — | <100 | — |
| 19 | 0.45 | 0.30 | 0.10 | 0.15 | 0.25 | 0.57 | 17 | 4700 | −15 |
| 20 | 0.45 | 0.20 | 0.10 | 0.25 | 0.35 | 0.47 | 18 | 4300 | +3 |
| 21 | 0.45 | 0.15 | 0.01 | 0.39 | 0.40 | 0.402 | 21 | 6200 | +4 |
| *22 | 0.55 | 0.30 | 0.05 | 0.10 | 0.15 | 0.56 | 18 | 1000 | −20 |
| 23 | 0.55 | 0.20 | 0.15 | 0.10 | 0.25 | 0.48 | 19 | 3700 | −25 |
| 24 | 0.55 | 0.10 | 0.05 | 0.30 | 0.35 | 0.38 | 20 | 3700 | −3 |
| *25 | 0.60 | 0.20 | 0.15 | 0.05 | 0.20 | 0.73 | 18 | 1200 | −13 |
| *26 | 0.35 | 0.30 | 0.25 | 0.10 | 0.35 | 1.10 | | poorly sintered | |
| *27 | 0.40 | 0.45 | 0.05 | 0.10 | 0.15 | 0.96 | | poorly sintered | |
| *28 | 0.40 | 0.10 | 0.05 | 0.45 | 0.50 | 0.61 | — | <100 | — |

Samples marked with * lie outside the scope of the present invention

Table 3 shows that the samples Nos. 4, 8, 11, 12, 18, 22, 25, 26, 27 and 28 of which the blending compositions of BaO, MgO, WO₃ and Ta₂O₅ lie outside the scope of the present invention, all exhibit Q-values which are smaller than 1200, and are poorly sintered. On the other hand, the samples of the present invention exhibit specific inductivities of greater than 10 and Q-values of greater than 3000. It will be understood that the temperature characteristics vary from −28 to 13 ppm/° C. with a change in the blending amount of Ta₂O₅.

According to the present invention as described above in detail, BaO, MgO, WO₃ and Ta₂O₅ are blended together at a predetermined ratio to obtain a large dielectric constant and a large Q-value in high-frequency regions. Moreover, the temperature characteristics can be freely controlled over a predetermined region. Thus, the dielectric ceramic composition can be favorably used as a material for a variety of kinds of resonators and as a dielectric substrate materials for MICs that are used in the microwave and milliwave regions.

We claim:

1. A dielectric ceramic composition for high-frequency use comprising BaO, MgO and WO₃, wherein when a composition formula is expressed as xBaO·yMgO·zWO₃, the values x, y and z satisfy, $$0.40 \leq x \leq 0.55$$
$$0.15 \leq y \leq 0.40$$
$$0.20 \leq z \leq 0.30$$
$$x + y + z = 1.$$

2. A dielectric material consisting essentially of a perovskite crystal phase represented by Ba(Mg₁/₂W₁/₂)O₃.

3. A dielectric ceramic composition for high-frequency use comprising SrO, MgO and WO₃, wherein when a composition formula is expressed as xSrO·yMgO·zWO₃, the values x, y and z satisfy, $$0.30 \leq x \leq 0.70$$
$$0.10 \leq y \leq 0.30$$
$$0.20 \leq z \leq 0.40$$
$$x + y + z = 1.$$

4. A dielectric material consisting essentially of a perovskite crystal phase represented by Sr(Mg₁/₂W₁/₂)O₃.

5. A dielectric ceramic composition for high-frequency use comprising BaO, MgO, WO₃ and Ta₂O₅, wherein when a composition formula by a molar ratio is expressed as xBaO·yMgO·zWO₃·wTaO₅/₂, the values x, y, z and w satisfy, $$0.40 \leq x \leq 0.55$$
$$0.10 \leq y \leq 0.40$$
$$0 < z \leq 0.30$$
$$0 < w < 0.40$$
$$0.20 \leq z + w \leq 0.40$$
$$0.17 \leq 5|x - 0.5| + y + 0.2z < 0.94$$
$$x + y + z = 1.$$

* * * * *